United States Patent
Albou et al.

(10) Patent No.: US 10,309,608 B2
(45) Date of Patent: Jun. 4, 2019

(54) PICTOGRAM-DISPLAYING SIGNALING DEVICE FOR A MOTOR VEHICLE, AND SIGNAL LIGHT EQUIPPED WITH SUCH A LIGHTING DEVICE

(71) Applicant: VALEO VISION, Bobigny (FR)

(72) Inventors: Pierre Albou, Paris (FR); Loic Boinet, Le Mesnil Esnard (FR); Boubacar Sagna, Sartrouville (FR); Xavier Morel, Paris (FR); Hafid El Idrissi, Pantin (FR); Stephan Sommerschuh, Paris (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/516,334

(22) PCT Filed: Sep. 15, 2015

(86) PCT No.: PCT/EP2015/071119
§ 371 (c)(1),
(2) Date: Mar. 31, 2017

(87) PCT Pub. No.: WO2016/050503
PCT Pub. Date: Apr. 7, 2016

(65) Prior Publication Data
US 2017/0305332 A1    Oct. 26, 2017

(30) Foreign Application Priority Data
Oct. 2, 2014 (FR) ...................................... 14 59453

(51) Int. Cl.
*F21S 43/13* (2018.01)
*F21S 43/30* (2018.01)
(Continued)

(52) U.S. Cl.
CPC ................ *F21S 43/13* (2018.01); *B60Q 1/26* (2013.01); *B60Q 1/2607* (2013.01); *B60Q 1/50* (2013.01);
(Continued)

(58) Field of Classification Search
None
See application file for complete search history.

(56) References Cited

U.S. PATENT DOCUMENTS 5,900,813 A * 5/1999 Ruminski ............ B60Q 1/2696
340/465
6,491,420 B1 * 12/2002 Scifres ................ B60Q 1/0011
340/479

(Continued)

FOREIGN PATENT DOCUMENTS

DE    10 2012 004 759 A1    9/2013
GB    2 405 755 A    3/2005
(Continued)

OTHER PUBLICATIONS

International Search Report dated Dec. 11, 2015, in PCT/EP2015/071119 filed Sep. 15, 2015.
(Continued)

*Primary Examiner* — Leon Viet Q Nguyen
(74) *Attorney, Agent, or Firm* — Oblon, McClelland, Maier & Neustadt, L.L.P.

(57) ABSTRACT

The invention concerns a signaling device adapted to display pictograms, notably for a motor vehicle. The device is configured to implement at least one signaling function of a motor vehicle. The device includes display means including a display zone intended to be disposed on the vehicle, the display means being adapted to display pictograms in the display zone, each pictogram emitting a light beam having at least in part the statutory photometric characteristics of at least one of said at least one signaling functions.

16 Claims, 4 Drawing Sheets

Figure 1:
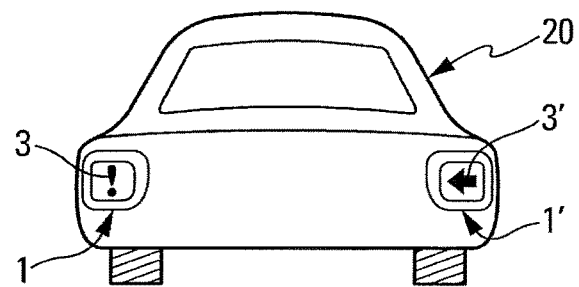

(51) Int. Cl.
*B60Q 1/50* (2006.01)
*B60Q 1/26* (2006.01)
*B60Q 1/52* (2006.01)
*F21S 43/14* (2018.01)
*G09G 3/02* (2006.01)
*F21S 41/16* (2018.01)

(52) U.S. Cl.
CPC ............ *B60Q 1/503* (2013.01); *B60Q 1/525* (2013.01); *F21S 41/16* (2018.01); *F21S 43/14* (2018.01); *F21S 43/30* (2018.01); *G09G 3/02* (2013.01); *G09G 2380/10* (2013.01)

(56) References Cited

U.S. PATENT DOCUMENTS

| | | | | |
|---|---|---|---|---|
| 7,579,940 | B2 * | 8/2009 | Schofield | ................ B60C 23/00 340/425.5 |
| 7,791,465 | B1 * | 9/2010 | El-Massry | ............ B60Q 1/503 307/10.1 |
| 2003/0012034 | A1 * | 1/2003 | Misawa | ............... B60Q 1/2607 362/545 |
| 2004/0218401 | A1 | 11/2004 | Okubo et al. | |
| 2007/0115680 | A1 * | 5/2007 | Tsai | ......................... B60Q 1/22 362/544 |
| 2011/0156894 | A1 * | 6/2011 | Lin | ......................... B60Q 1/38 340/471 |
| 2015/0156448 | A1 | 6/2015 | Lee | |

FOREIGN PATENT DOCUMENTS

| | | |
|---|---|---|
| JP | 60-203543 A | 10/1985 |
| WO | WO 2009/095029 A1 | 8/2009 |

OTHER PUBLICATIONS

French Search Report dated Jun. 12, 2015, in French Application 1459453 filed Oct. 2, 2014.

* cited by examiner

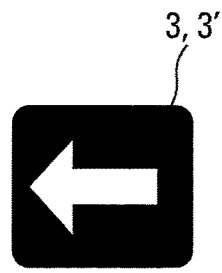 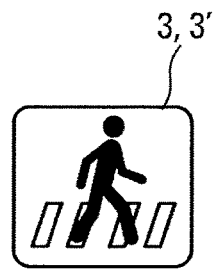 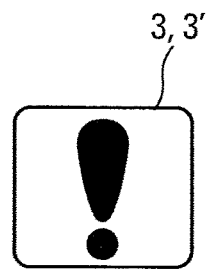
Fig. 4A     Fig. 4B     Fig. 4C
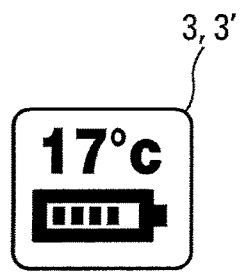 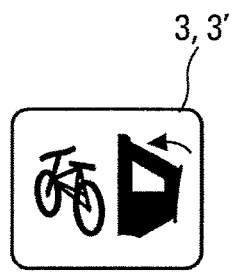 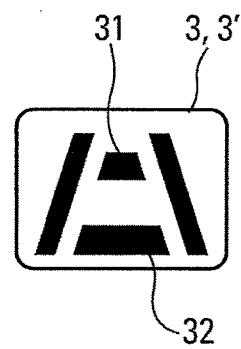
Fig. 4F     Fig. 4D     Fig. 4E
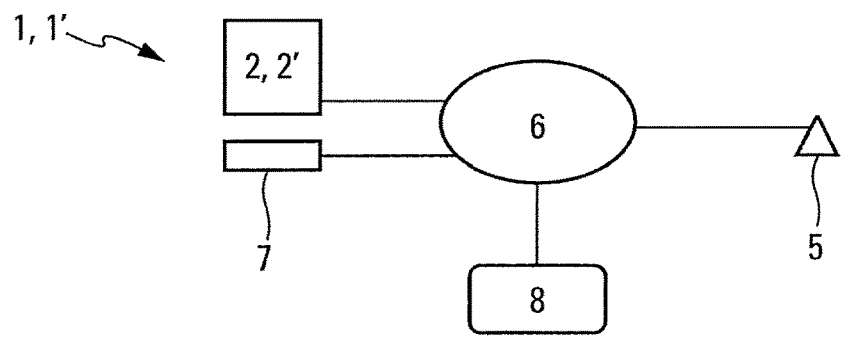
Fig. 5

PICTOGRAM-DISPLAYING SIGNALING DEVICE FOR A MOTOR VEHICLE, AND SIGNAL LIGHT EQUIPPED WITH SUCH A LIGHTING DEVICE

The present invention concerns a signaling device for motor vehicles adapted to display pictograms and a signal light including a signaling device of this kind.

Motor vehicle signal lights, generally situated at the rear of the vehicle, are lighting devices that comprise one or more light sources and an outer lens that closes the light. To simplify, the light source emits light rays to form a light beam that is directed toward the outer lens in order to produce a patch of light that transmits the light to the outside of the vehicle. The color of the patch of light is characteristic of the function or the type of light. Thus it is known that a white patch of light indicates that the light is a reversing light, that an amber patch of light is a turn indicator, and that a red patch of light is a rear running light or a brake light, the brake light being of greater luminous intensity. There also exist red fog lights, the intensity of which is even greater so as to be visible under difficult climatic conditions, such as fog, heavy rain or snow. In addition to the color, these lights have to comply with regulations with regard to luminous intensity and angles of visibility in particular.

However, although each light has a particular statutory meaning, this may prove insufficiently explicit for an observer. It is necessary to decode the color and the type of light that is actuated in order to attempt to understand the intentions of the driver of a vehicle or, for example, the emergency situation they are encountering. When vehicles are in traffic it is therefore not obvious or possible to understand precisely the situation encountered by a vehicle if one of its lights is lit. Indeed, even if the driver of a following vehicle sees a brake light lit on a vehicle in front of them, the mere lighting of the light does not give them any information as to the exact cause of braking.

Moreover, the number of different lights being limited to those mentioned above, some situations are difficult to describe with as restricted a number of messages. In many situations a vehicle is not able to alert other vehicles more precisely to events that are occurring.

The invention therefore aims to provide a lighting device configured to reinforce the understanding of certain situations, to warn more precisely of circumstances encountered by a vehicle, and to increase the different types of information that serve to alert other vehicles.

To this end, the invention concerns a signaling device adapted to display pictograms, notably for a motor vehicle, the device being configured to implement at least one signaling function of a motor vehicle.

The device is noteworthy in that it includes display means including a display zone intended to be disposed on the vehicle, the display means being adapted to display pictograms in the display zone, each pictogram emitting a light beam having at least in part the statutory photometric characteristics of at least one of said at least one signaling functions.

For a certain number of situations encountered by a vehicle, a specific pictogram can therefore be displayed in order to alert other vehicles precisely to it. The device therefore increases the number of different messages that can be observed and understood clearly by other road users. Moreover, as all the pictograms can be displayed in the same display zone, adding specific new lights is avoided.

Moreover, the light pictogram beam having at least in part the statutory photometric characteristics, the necessary consumption of energy is not increased, that is to say the consumption of the display means that is added to the normal consumption of the light or lights. Moreover, the pictograms therefore do not generate an unwanted supplementary beam degrading the statutory photometric characteristics of the beam and that could therefore entail the risk of prohibition of the use of the signaling device.

According to various embodiments of the invention, separately or in combination
- the display means are configured so that the light beam emitted by a pictogram alone has the statutory photometric characteristics of the signaling function;
- said device includes complementary signaling means including a complementary zone, the complementary means being configured to emit a complementary light beam emitted from the complementary zone, the combination of the pictogram light beam and the complementary light beam having the statutory characteristics;
- the complementary means include a light source adapted to emit light rays and means for distributing the light rays over the complementary zone in order to form the complementary light beam;
- the display zone and the complementary zone are adjacent;
- the complementary zone surrounds the display zone at least in part;
- the at least one pictogram relates to emergency situations;
- the at least one pictogram relates to general traffic information;
- the pictograms are dynamic;
- said device includes a control unit configured to control automatically the display of the pictograms as a function of parameters of the vehicle and/or the environmental situation of the vehicle;
- said device includes sensors disposed on the vehicle, the sensors being configured to evaluate the environmental situation of the vehicle;
- the sensors include a video camera;
- the sensors are adapted to detect a passage of an external person or object in a blind spot of the vehicle;
- at least one of the pictograms relates to information that does not come from the video camera, for example temperature or safe following distance or braking intensity information;
- the control unit includes programmable commands configured to set the parameters of the display of the pictograms;
- the display means are adapted to display the pictograms with different levels of luminous intensity;
- the display means include a liquid crystal, plasma, inorganic or organic light-emitting diode type screen, the display zone being that of the screen;
- the display means include at least one laser source adapted to form a laser beam, a transmission surface defining the display zone, and sweeping means configured to sweep the laser beam over the transmission surface;
- the display means include a matrix of micromirrors coupled to at least one light-emitting diode;
- the display means include a surface light guide including groups of prism-type structures or cavities on one of its lateral faces.

The invention also relates to a signal light including a signaling device of the above kind adapted to display pictograms.

Figure 2:
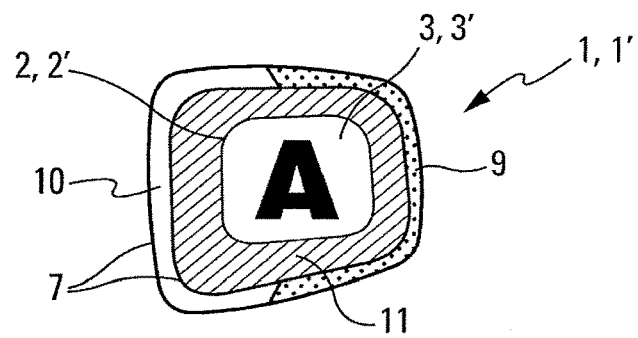
Figure 3:
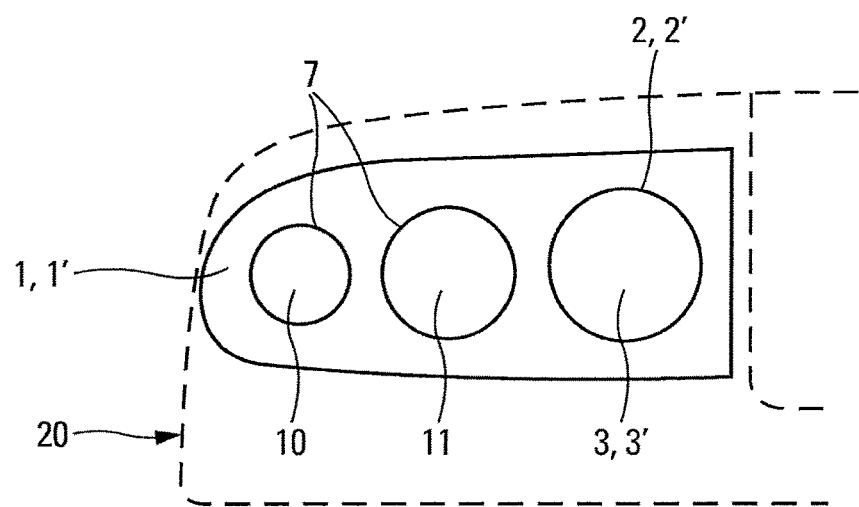
Figure 6:
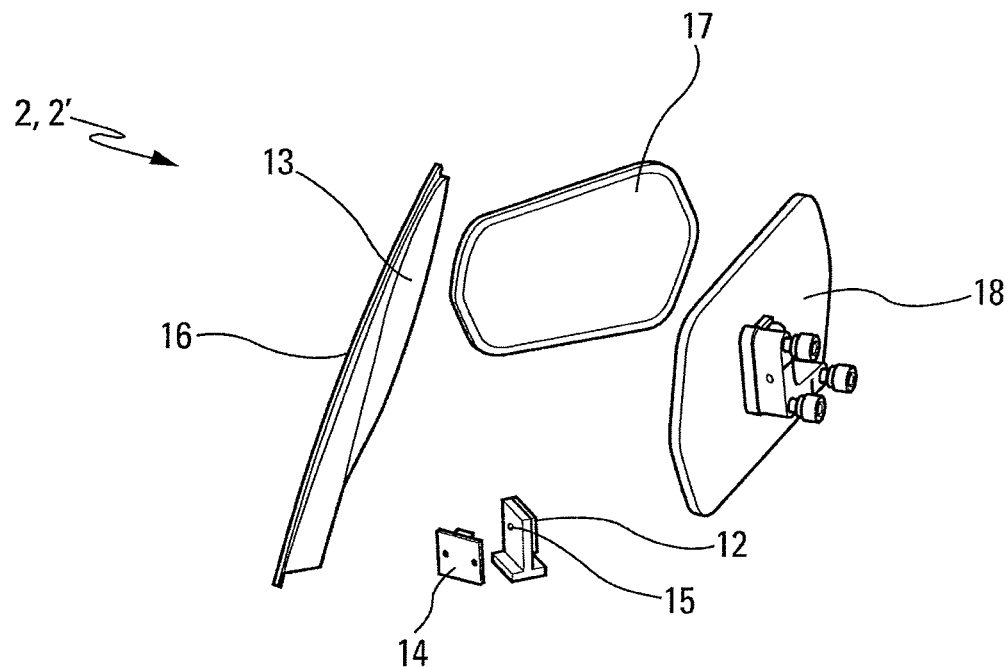
Figure 7:
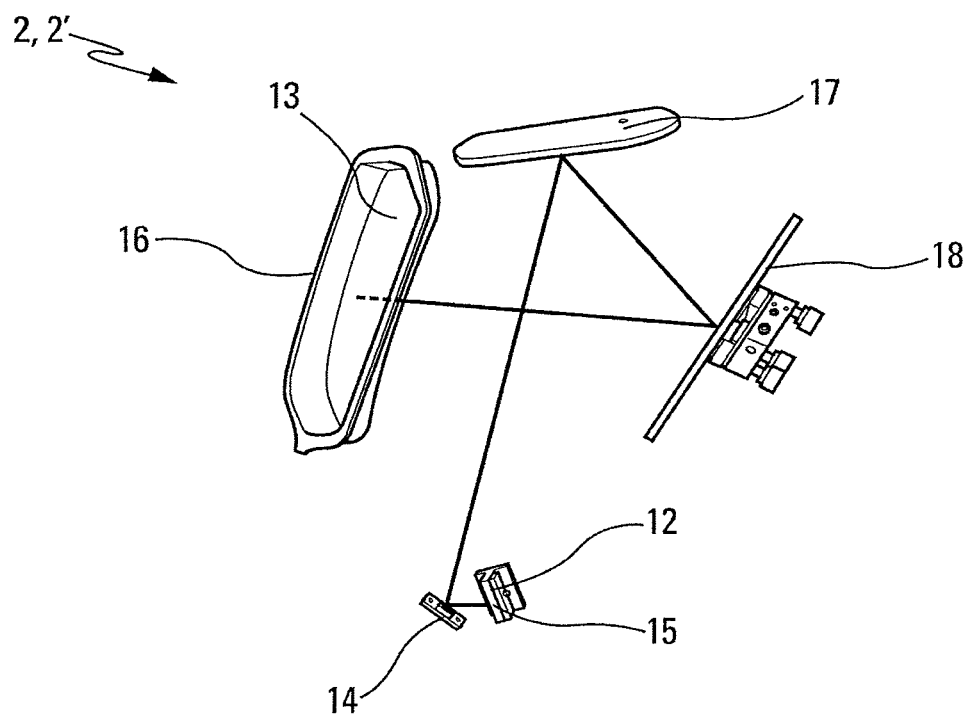
Figure 8:
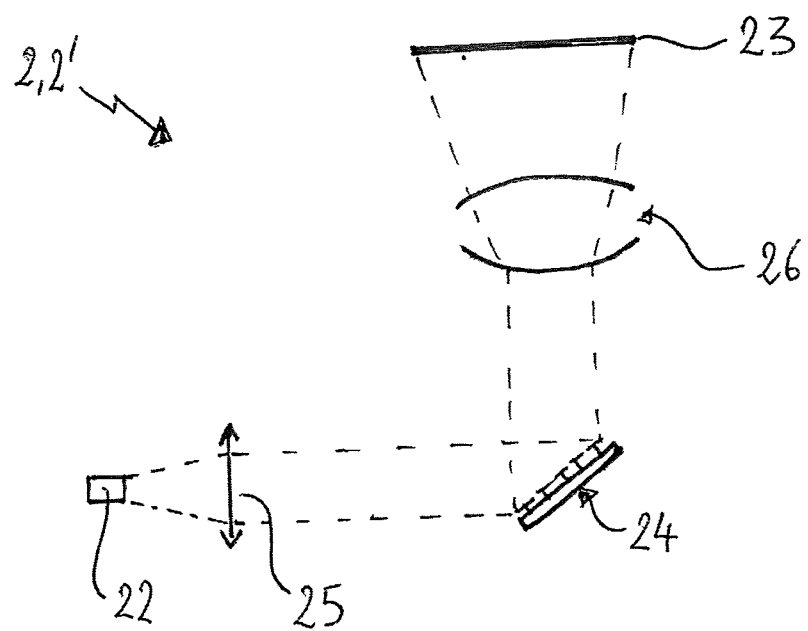

The invention will be better understood in the light of the following description which is given by way of nonlimiting illustration only and is accompanied by the appended drawings:

FIG. 1 showing diagrammatically a vehicle equipped with two signaling devices according to a first embodiment of the invention adapted to display pictograms;

FIG. 2 showing diagrammatically a signaling device according to a second embodiment of the invention adapted to display pictograms, FIG. 3 showing diagrammatically a signaling device according to a variant of the second embodiment of the invention adapted to display pictograms, FIG. 4 showing diagrammatically examples of pictograms, FIG. 5 being a block diagram illustrating one embodiment of the invention, FIG. 6 being a diagrammatic perspective view of one embodiment of the display means according to the invention, FIG. 7 being a diagrammatic top view of the display means from FIG. 6, FIG. 8 being a diagrammatic side view of display means according to another embodiment of the invention.

FIG. 1 shows a vehicle 20 equipped with two signaling devices 1, 1' adapted to display pictograms. Each signaling device 1, 1' includes display means having a display zone 3, 3' arranged at the rear of the vehicle 20, substantially at the usual location of a rear signal light. The function of the display means is to display pictograms in the display zone 3, 3', various types of display means 2, 2' being described hereinafter.

The statutory photometric characteristics of signal lights such as running lights, turn indicators, brake lights or fog lights are clearly defined. They notably concern the minimum and maximum ranges of luminous intensity to be complied with, the angle of visibility of the beam, the color of the beam, the area of the illuminating surface of the function, or the minimum distance between different functions. For example, a fog light must be at least 10 cm from the brake light to prevent confusing them.

In a first embodiment, shown in FIG. 1, the display means 2, 2' are configured so that the light being emitted by a pictogram alone has the statutory photometric characteristics of a defined signaling function. In this embodiment, each pictogram displayed has parameters set to emit a light beam that complies with all the regulatory requirements referred to above. A single pictogram can notably have a plurality of functions simultaneously or alternately, such as a turn indicator and a running light, for example. A plurality of pictograms can also be displayed simultaneously or alternately, each pictogram having the photometric characteristics of a different function of the signal light.

The signaling function implemented with the pictogram or pictograms is preferably and advantageously a running light (or side light) function or a combined running light and brake light function.

In a second embodiment shown in FIGS. 2 and 3 the device 1, 1' includes complementary signaling means 7. These complementary means 7 are adapted to provide a complementary beam that is added to the pictogram beam. The combination of the complementary beam and the pictogram beam makes it possible to obtain the statutory photometric characteristics that the pictogram beam alone does not have. The complementary means 7 include at least one complementary zone 10, 11, here two of them, each adapted to transmit a complementary light beam. Accordingly, thanks to the complementary means 7, the lighting device 1, 1' provides an overall light beam that has the statutory photometric characteristics.

The complementary means 7 are for example lighting devices used for the usual signal light functions that are independent of the display means 2, 2'. They include a light source adapted to emit light rays, for example one or more light-emitting diodes, and means for distributing the light rays over the complementary zone 10, 11, the complementary zone 10, 11 transmitting the light rays to form the complementary beam. The distribution means may be a light guide or a reflector.

In this embodiment, a displayed pictogram produces a light beam that has characteristics of its own with regard to the pictogram shape and type. For example, the angle of visibility or the area of the illuminated surface are different from one pictogram to another. On the other hand, the color is chosen so as to correspond to the corresponding function. The complementary means 7 are therefore configured to compensate the differences of each pictogram compared to the statutory photometric characteristics. When a pictogram appears or changes shape, the complementary means 7 produce the appropriate complementary beam substantially simultaneously, for example to widen the viewing angle and/or the illuminated area of the overall beam.

As shown in the FIG. 2 embodiment, the device 1, 1' may include a plurality of complementary means 7, here two of them, one per function. The two complementary zones 10, 11 are arranged at least in part around the display zone 3, 3' of the pictogram. A first adjacent complementary zone 11 surrounds the display zone 3, 3' and serves to complement the running light function—possibly combined with a brake light function. A second complementary zone 10 surrounds in part the first complementary zone 11 and serves to complement the turn indicator (direction indicator) function. Moreover, a cat's eye 9 completes the circuit of the first complementary zone 11.

In the example shown, if the choice is made for the display zone 3, 3' to implement only a running light function or a combined running light/brake light function, then the second complementary zone 10 provides only the turn indicator function.

Thanks to the complementary means 7, it is certain that whichever pictogram is displayed the overall light beam emitted by the device 1, 1' conforms to the regulations. Moreover, the adjacent complementary zone or zones 10, 11 reduce(s) the necessary adjustment of the intensity of the pictogram beam to have the statutory characteristics of the function of the light. Substantially all the pictograms advantageously emit a light beam with the same intensity, the complementary means 7 being configured to emit a complementary beam making it possible to adjust the overall intensity to suit each function. In other words, the complementary means 7 adjust the complementary beam to suit each pictogram displayed.

In a variant of the second embodiment shown in FIG. 3 the complementary zones 10, 11 and the display zone 3, 3' are separate. The device 1, 1' on the vehicle includes three substantially circular zones 3, 3' and 10, 11 side by side. The first complementary zone 11 corresponding to the running light function is at the center, for example. The second complementary zone 10 corresponding to the turn indicator function is on the side toward the outside of the vehicle. Finally, the display zone 3, 3' is on the side toward the middle of the vehicle.

FIG. 4 shows a few examples of pictograms displayed in the display zone 3, 3' and of which two types can be distinguished, for example.

Some pictograms warn of an emergency situation or hazard, for example a directional arrow (4A), a pedestrian crossing in front of the vehicle (4B), an exclamation mark warning of a hazard (4C), a door opening warning (4D) or a warning to observe a safe following distance (4E).

Other pictograms give general information, for example that the driver of the vehicle is a learner driver by displaying the letter A (in France) or L, as shown in the FIG. 2 pictogram. The logo of the manufacturer of the vehicle may also be displayed by default when the signaling function is activated or only on remotely unlocking the vehicle (the driver welcoming function, known as "coming home"). Moreover, in the case of a driver welcoming scenario, the device of the invention can be used to display information on the status of the vehicle, such as the internal temperature, the amount of fuel in the tank or the amount of charge in the battery, as shown in FIG. 4F.

Some pictograms can be displayed dynamically, by altering their size, movement or blinking. For example, the pictogram 4E concerning the safe following distance, in which the size of and the distance between the blocks 31 and 32 that represent the vehicles, could evolve dynamically in real time as a function of the actual distance between the vehicles.

FIG. 5 shows one embodiment of the signaling device 1, 1' and illustrates its operation. In addition to the display means 2, 2', here the device 1, 1' includes a control unit 6 and sensors 5 disposed on the vehicle. The sensors 5 are configured to detect or to calculate certain parameters making it possible to evaluate the environmental situation of the vehicle. The parameters concern the vehicle, for example, such as its speed, acceleration or braking, and are measured by ultrasound sensors, for example. The sensors may also be environmental sensors (video cameras, GPS, etc.) to observe the environment of the car. All these sensors 5 are connected to the control unit 6 to supply it with these parameters.

The control unit 6 is configured to control automatically the display of the pictograms as a function of the parameters of the vehicle and/or the environmental situation of the vehicle. To this end, it transmits commands to the display means 2, 2'. The control unit 6 determines the pictogram to be displayed as a function of the situation. It can also cause the appearance of the pictogram to evolve dynamically as a function of those parameters, for example in the case of the safe following distance. The size of the pictogram may for example be adapted as a function of the distance of the following vehicle, in order to improve the visibility distance.

In the corresponding embodiment, the control unit 6 also sends commands to the complementary means 7 to coordinate them with the means 2, 2' for displaying the pictogram. The pictogram beam and the complementary beam are therefore coordinated to have the statutory photometric characteristics.

Moreover, the control unit 6 includes programmable commands that are configured to set the parameters for the display of the pictograms and are accessible via an interface 8 in the passenger compartment of the vehicle, for example. Thus to show that the driver is a learner driver requires the driver to act in a controlled manner on this interface 8.

In the case of a pair of signaling devices 1, 1', each display means 2, 2' may be controlled independently of the other by the control unit 6. The control unit 6 can also generate combinations of different pictograms on each display means 2, 2' in order to provide complete information to following vehicles. For example, information that concerns a hazardous situation is displayed on a display zone 3 of the first device 1, other information concerning the direction being displayed on a display zone 3' of the second device 1', as shown in FIG. 1.

According to a first embodiment of the display means, not shown in the figures, each of the display means is a screen of liquid crystal, plasma or light-emitting diode type, the display zone of the device being that of the screen.

According to a second embodiment of the display means, not shown in the figures, the display means include a surface light guide including groups of prism-type structures or cavities on one of its lateral faces. The structures are designed to redirect toward an opposite face light selectively injected through one of the edge surfaces. There is therefore a screen with zones illuminated selectively via the edge surfaces. This type of display is described for example in the documents FR2994248 and US2013314944.

According to a preferred embodiment of the invention, the pictograms are generated on a transmission surface that defines the display surface by means of a light beam that is entirely parameterable and configurable.

Thus according to a third embodiment of the display means 2, 2' shown in FIGS. 6 and 7 the display means 2, 2' include at least one laser source 12 adapted to form a laser beam, a transmission surface 13 defining the display zone 3, and sweeping means 14 configured to sweep the laser beam over the transmission surface 13. The transmission surface 13 is for example on the outer lens 16 closing the light. The laser beam issuing from the laser source 12 is intended to illuminate the transmission surface 13.

The laser source 12 includes for example a laser diode emitting radiation at a wavelength which is chosen to produce the color corresponding to the function of the light on the outer lens 6. Alternatively, a wavelength conversion device, for example a phosphor plate, is provided on the path of the laser beam to convert the wavelength of the laser radiation and thus produce the required color. The laser source 12 can also include an optical device combining a plurality of laser beams into a single beam, for example using optical fibers or devices exploiting different polarizations of different laser sources.

The display means 2, 2' include an optical system 15 configured to collimate the light beam from the laser source 12. The optical system 15 is for example a single collimator lens.

Depending on the laser source 12 and the optical system 15 chosen, the laser beam can project onto the transmission face 13 a light spot in the shape of a spot, a larger patch or even an oblong mark. The sweeping means 14 sweep the light spot at a sufficiently high speed for the human eye not to perceive its movement over the transmission surface 13.

Before impinging on the transmission surface 13, the laser beam from the laser source 12 is preferably redirected by the sweeping means 14 onto a first mirror 17 that reflects it towards a second mirror 18. The second mirror 18 in turn reflects the laser beam toward the transmission surface 13 of the outer lens 16 of the light. The two mirrors 17, 18 serve to bend the optical path of the laser beam to produce a compact light at the same time as allowing the laser beam to sweep the transmission surface 13 at an angle of incidence close to the normal. FIG. 7 shows the display means 2, 2' with the path of the laser beam from the light source 12 to the outer lens 16.

Here the sweeping means 14 consist of a mobile micromirror making it possible to sweep the transmission surface 13 by reflection of the laser beam in a first direction of the transmission surface 13, which is a horizontal direction, for example. The micromirror is moved with a periodic movement produced by an actuator (not shown). The micromirror moves about a rotation axis orthogonal to the first direction in order for the light spot of the laser beam to sweep the transmission surface 13 in said first direction.

The micromirror is also configured to sweep the laser beam over the transmission surface 13 in a second direction substantially perpendicular to the first direction in order to produce a movement of the beam such that it moves easily over the transmission surface 13. In other words, it is the same micromirror that sweeps the laser beam over the transmission surface 13 in the two directions. The micromirror therefore performs another movement, for example of rotation about a second rotation axis perpendicular to the previous one. The micromirror therefore enables the light spot of the laser beam to sweep over the transmission surface 13 both horizontally and vertically.

A variant of this third embodiment, not shown in the figures, consists in using a second micromirror to sweep the laser beam in the second direction. In this case, the sweeping means include two micromirrors disposed one after the other on the optical path of the beam, each having the function of sweeping the laser beam over the transmission surface in one of the two directions.

In the description, the micromirrors referred to as sweeping means are for example of MEMS (Micro-Electro-Mechanical System) type. However, the invention is in no way limited to these sweeping means and can use other kinds of sweeping means such as a series of mirrors arranged on a rotary element, the rotation of that element causing the sweeping of the transmission surface by the laser beam.

The sweeping of the laser beam by the sweeping means 14 makes it possible to cause pictograms to appear on the transmission surface 13, the sweeping means 14 being controlled by the control unit, for example.

According to a particularly preferred fourth embodiment of the display means 2, 2' shown in FIG. 8 the display means 2, 2' include at least one light source 22 in the form of at least one light-emitting diode, a transmission surface 23 defining the display zone 3, and a matrix of micromirrors 24 configured to reflect the light rays from the at least one light source toward the transmission surface 23. The transmission surface 23 is for example on the outer lens closing the light or formed by a translucent screen placed behind that closing outer lens. The light beam from the light source 22 is intended to illuminate the transmission surface 23.

To be more precise, this embodiment includes collimation means 25 formed by at least one optical lens in order to collimate the rays from the at least one light source 22 onto the matrix of micromirrors 24 and an optical system 26 for focusing the rays reflected by the matrix of micromirrors 24 toward the transmission surface 23 in order for the emitted beam forming the pictogram to be well focused on the transmission surface in order for the pictogram to appear sharp and well defined.

The light source or sources 22 is/are formed of at least one light-emitting diode. There is advantageously a set of light sources, a set of the multichip light-emitting diode type, that is to say a single electronic component including a plurality of electroluminescent emitters.

According to one feature, the light emitted by these light-emitting diodes is red, amber or white.

The transmission surface is advantageously translucent and neutral in color; the color of the pictogram displayed is then a function of the color of the light source activated according to the type of statutory function implemented.

In this last embodiment, the display means 2, 2' include a matrix of micromirrors 24 (also known as DMD or Digital Micromirror Devices) that direct the light rays by reflection. The light rays are reflected in two possible directions: either toward the focusing optical system or in a direction different from the focusing optical system.

To this end, each micromirror can pivot between two fixed positions, a first position in which the light rays are reflected toward the focusing optical system and a second position in which the light rays are reflected in a direction different from the focusing optical system. The two fixed positions are oriented in the same manner for all the micromirrors and define relative to a reference plane supporting the matrix of micromirrors an angle α characteristic of the matrix of micromirrors and defined in its specifications. This angle α is generally less than 20° and usually approximately 12°.

Accordingly, each micromirror reflecting a small portion of the light rays impinging on the matrix, the change of position makes it possible to modify the shape of the beam emitted by the focusing optical system and ending up on the transmission surface 23. The light rays redirected toward the focusing optical system by the micromirrors contribute to the pictogram displayed by the display means. And the light rays redirected by the micromirrors in a different direction do not contribute to the pictogram.

This fourth embodiment is particularly preferred over the other embodiments and in particular the third embodiment. Indeed, that third embodiment involving a collimated light source of high brightness, notably a laser source coupled to sweeping means, has numerous disadvantages: first of all, if sweeping is stopped, there is a risk to the eyes because of the high brightness; then, the use of a laser source implies diffraction of the beam at the transmission surface whence unintended rays and pictograms that appear out of focus or duplicated; finally, the MEMS component is subject to problems of stability, its behavior being disturbed by the radiation received from the high-brightness light source, which generates an unstable display with a pictogram that moves or oscillates.

The fourth embodiment addresses these disadvantages by offering a device in which the display of the pictograms is more stable and by not necessitating a light source of high brightness to achieve the required statutory performance, notably for a brake light or rear running light (side light) function, thereby solving the problems of safety inherent to the use of high-brightness collimated sources of the laser source type.

The invention claimed is:

1. A signaling device for a motor vehicle adapted to display pictograms, comprising:
   a display zone disposed on the vehicle,
   a complementary zone that surrounds the display zone, and
   circuitry configured to
     display a pictogram in the display zone, the pictogram emitting a light beam that partially meets in shape and intensity statutory photometric characteristics of at least one signaling function; and
     emit a complementary light beam from the complementary zone, wherein
   the complementary light beam compensates differences of shape and intensity of the pictogram, so that a combination of the display zone light beam and the complementary light beam meets in the shape and intensity statutory photometric characteristics.

2. The signaling device according to claim 1, further comprising:

a light source adapted to emit light rays and means for distributing the light rays over the complementary zone in order to form the complementary light beam.

3. The signaling device according to claim 1, wherein the pictogram relates to emergency situations.

4. The signaling device according to claim 1, wherein the pictogram relates to general traffic information.

5. The signaling device according to claim 1, wherein the pictogram is dynamic.

6. The signaling device according to claim 1, wherein the circuitry is further configured to control automatically the display of the pictograms as a function of parameters of the vehicle or the environmental situation of the vehicle.

7. The signaling device according to claim 6, further comprising:
sensors disposed on the vehicle, the sensors being configured to evaluate the environmental situation of the vehicle.

8. The signaling device according to claim 6, wherein the circuitry is further configured to set the parameters of the display of the pictograms.

9. The signaling device according to claim 1, wherein the display zone is a liquid crystal, plasma, inorganic or organic light-emitting diode type screen.

10. The signaling device according to claim 1, wherein the display zone includes at least one laser source adapted to form a laser beam, a transmission surface defining the display zone, and the circuitry is further configured to sweep the laser beam over the transmission surface.

11. The signaling device according to claim 1, wherein the display zone includes a surface light guide including groups of prism-type structures or cavities on one of its lateral faces.

12. The signaling device according to claim 1, wherein the display zone includes at least one light source in the form of at least one light-emitting diode, a transmission surface defining the display zone, and a matrix of micromirrors configured to reflect the light rays from the at least one light source toward the transmission surface.

13. A motor vehicle signal light including a signaling device, according to claim 1, adapted to display pictograms.

14. The signaling device according to claim 1, wherein an appearance of the pictogram evolves dynamically according to a distance between a following motor vehicle and the motor vehicle.

15. The signaling device according to claim 1, further comprising:
a second complementary zone that surrounds in part the complementary zone, the second complementary zone emitting a second complementary light beam.

16. The signaling device according to claim 15, wherein the second complementary light beam complements a turn indicator function of the pictogram.

* * * * *